United States Patent
Andersen

(10) Patent No.: US 10,570,025 B2
(45) Date of Patent: Feb. 25, 2020

(54) APPARATUS FOR SIMULTANEOUS PRODUCTION OF DISTILLED WATER AND HOT WATER

(71) Applicant: Idekontoret ApS c/o Nordic Corporate Finance, Horsholm (DK)

(72) Inventor: Tom Juul Andersen, Hjärnarp (SE)

(73) Assignee: IDEKONTORET APS, Hørsholm (DK)

( * ) Notice: Subject to any disclaimer, the term of this patent is extended or adjusted under 35 U.S.C. 154(b) by 0 days.

(21) Appl. No.: 15/705,614

(22) Filed: Sep. 15, 2017

(65) Prior Publication Data
US 2018/0002194 A1 Jan. 4, 2018

Related U.S. Application Data

(63) Continuation of application No. PCT/DK2016/050071, filed on Mar. 15, 2016.

(30) Foreign Application Priority Data

Mar. 17, 2015 (DK) .................................. 2015 00162

(51) Int. Cl.
*B01D 5/00* (2006.01)
*C02F 1/04* (2006.01)
(Continued)

(52) U.S. Cl.
CPC ............ *C02F 1/048* (2013.01); *B01D 1/0017* (2013.01); *B01D 1/0035* (2013.01); *B01D 3/02* (2013.01);
(Continued)

(58) Field of Classification Search
CPC .... C02F 1/14; C02F 1/04; C02F 1/041; C02F 1/042; C02F 1/043; C02F 1/045;
(Continued)

(56) References Cited

U.S. PATENT DOCUMENTS 3,357,897 A * 12/1967 Salzer ..................... C02F 1/14
 202/174
3,357,898 A * 12/1967 Novakovich ............. C02F 1/14
 202/234
(Continued)

FOREIGN PATENT DOCUMENTS

| AU | 2011211830 | 8/2012 |
| CN | 203866058 U | 10/2014 |
| DE | 102008052964 A1 | 4/2010 |

*Primary Examiner* — Jonathan Luke Pilcher
(74) *Attorney, Agent, or Firm* — Lambert Shortell & Connaughton; Gary E. Lambert; David J. Connaughton, Jr.

(57) ABSTRACT

A hot water and distillation apparatus configured to simultaneously produce distilled water and hot water is disclosed. The hot water and distillation apparatus comprises a hot water tank, a condensation and evaporation chamber, an (feed water) evaporation tray provided in the condensation and evaporation chamber, a heat source thermally connected to the evaporation tray. The hot water and distillation apparatus is configured to condensate evaporated feed water from the evaporation tray by means of heat exchange between the hot water tank and a condensation surface. The condensation surface is provided at the outside surface of the hot water tank. The heat source is thermally connected to the evaporation tray. The hot water and distillation apparatus comprises a distillate collection member configured to collect distillate. The hot water tank, the evaporation tray and the distillate collection member are provided in the condensation and evaporation chamber.

15 Claims, 12 Drawing Sheets

(51) Int. Cl.
  *B01D 1/00* (2006.01)
  *B01D 3/02* (2006.01)
  *C02F 1/14* (2006.01)

(52) U.S. Cl.
  CPC ......... *B01D 5/0003* (2013.01); *B01D 5/0018* (2013.01); *B01D 5/0066* (2013.01); *C02F 1/04* (2013.01); *C02F 1/043* (2013.01); *C02F 1/14* (2013.01); *B01D 5/006* (2013.01); *C02F 2201/009* (2013.01); *Y02A 20/212* (2018.01)

(58) Field of Classification Search
  CPC .......... C02F 1/046; C02F 1/047; C02F 1/048; C02F 1/06; C02F 1/08; C02F 1/10; C02F 1/13; C02F 1/18; B01D 1/0035; B01D 1/0041; B01D 1/0064; B01D 61/364; B01D 1/0011; B01D 1/0017; B01D 1/0029; B01D 1/0058; B01D 1/007; B01D 1/0076; B01D 5/0057; B01D 5/006; B01D 5/0063; B01D 5/0069
  See application file for complete search history.

(56) References Cited

U.S. PATENT DOCUMENTS

| | | | | |
|---|---|---|---|---|
| 3,359,183 | A | * | 12/1967 | Kenk ................... B01D 5/0066 202/190 |
| 3,775,257 | A | * | 11/1973 | Lovrich .................... C02F 1/14 202/234 |
| 4,488,935 | A | * | 12/1984 | Ruhe ...................... B01D 3/006 202/177 |
| 5,053,110 | A | * | 10/1991 | Deutsch ................... B01D 3/02 202/176 |
| 5,181,991 | A | * | 1/1993 | Deutsch ............... B01D 5/0066 202/176 |
| 5,348,622 | A | * | 9/1994 | Deutsch ................... B01D 3/42 202/176 |
| 5,348,623 | A | | 9/1994 | Salmon |
| 5,628,879 | A | * | 5/1997 | Woodruff ................. C02F 1/14 202/234 |
| 2003/0150704 | A1 | | 8/2003 | Posada |
| 2013/0068608 | A1 | | 3/2013 | Ba-Abbad et al. |

* cited by examiner

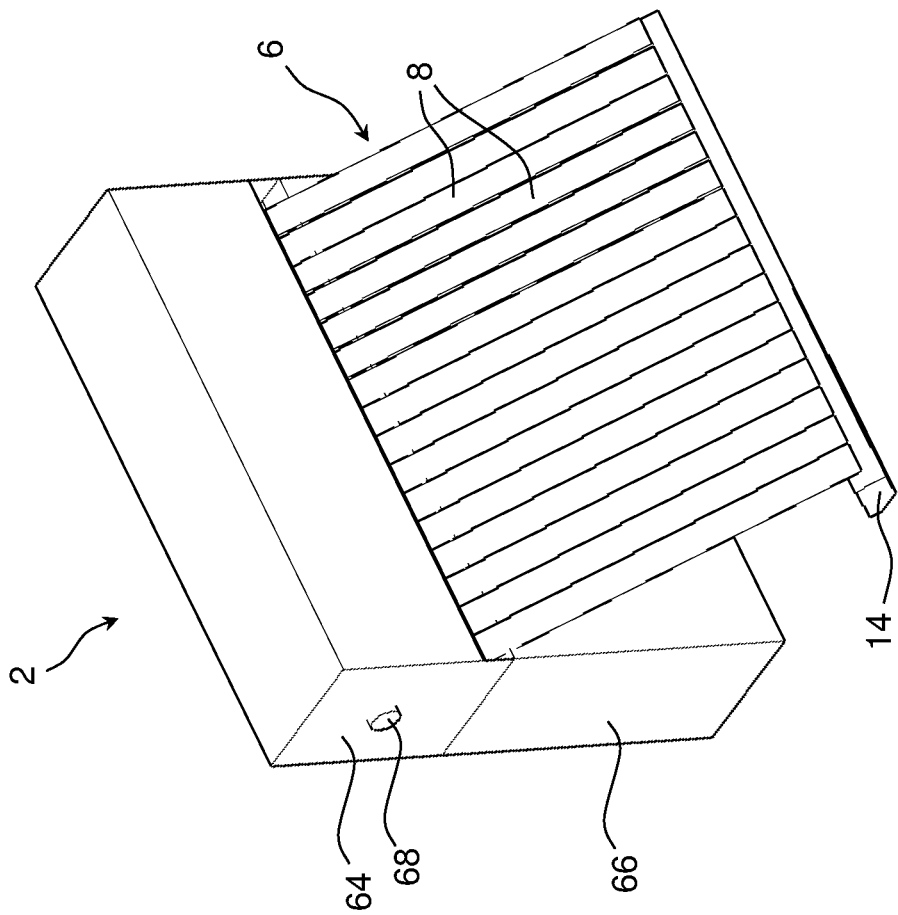
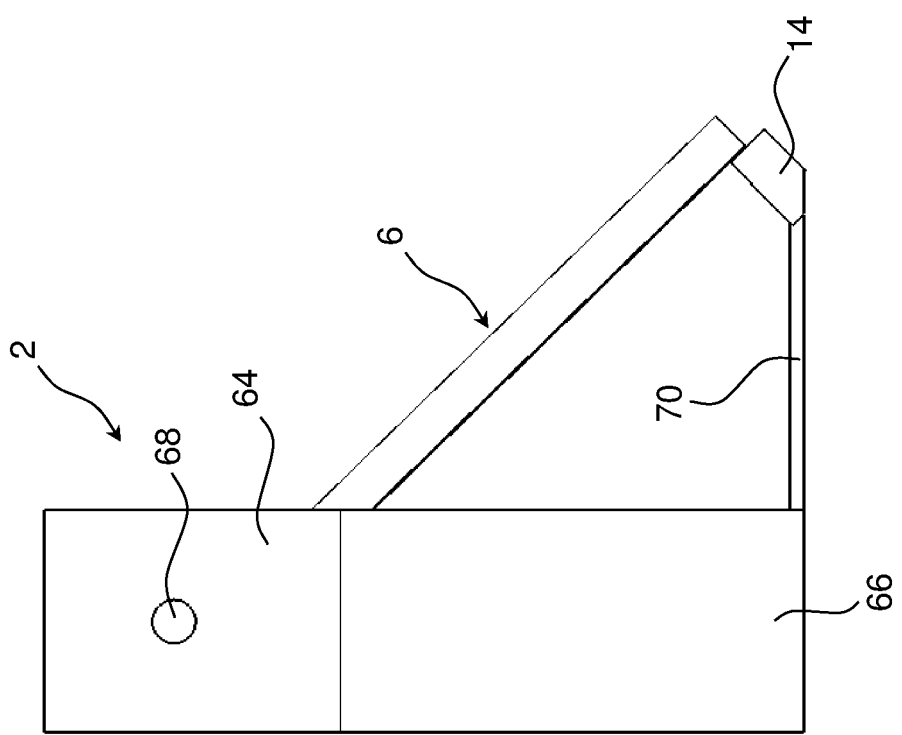
Fig. 5B
Fig. 5A

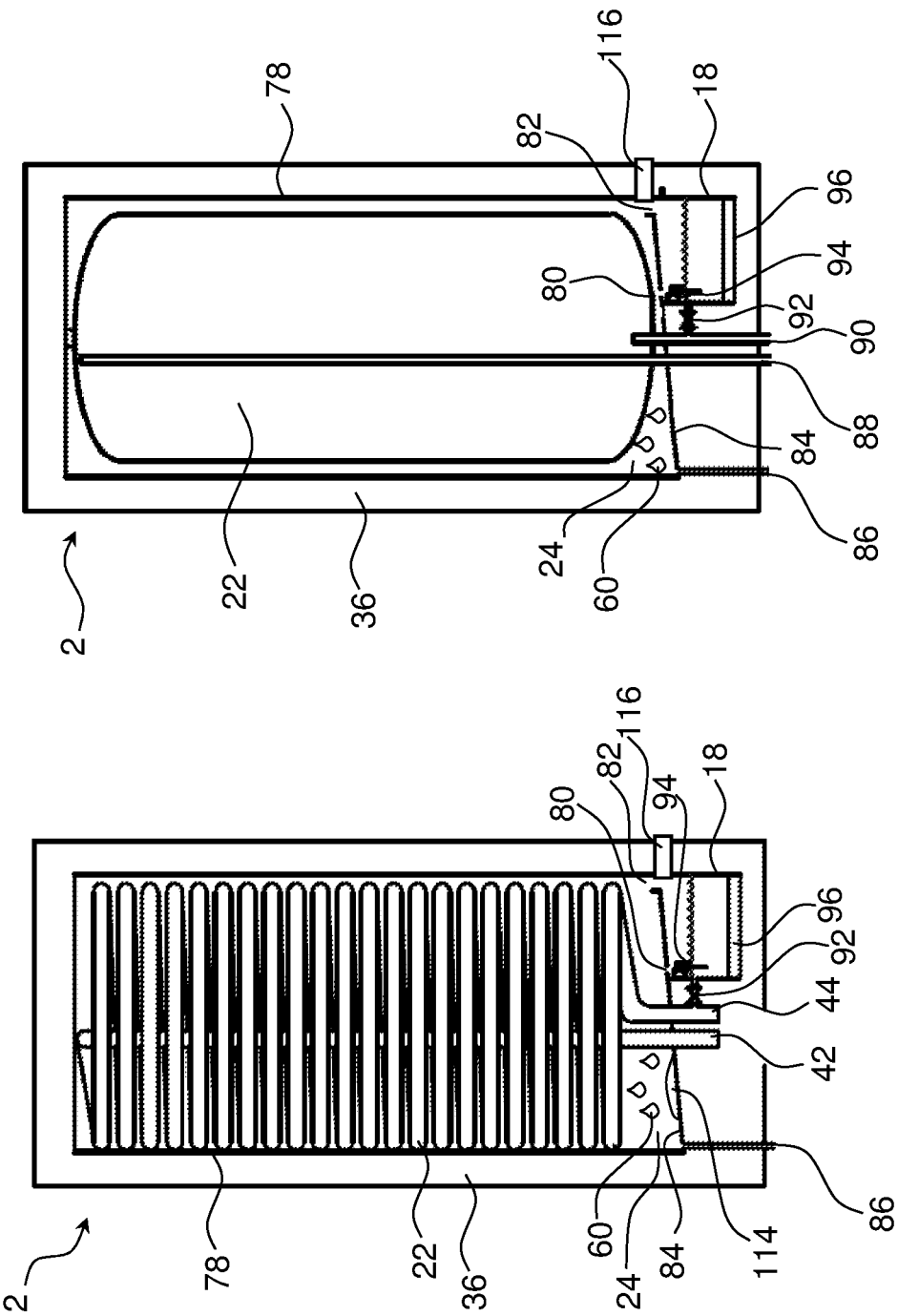

APPARATUS FOR SIMULTANEOUS PRODUCTION OF DISTILLED WATER AND HOT WATER

FIELD OF INVENTION

The present invention relates to a hot water and distillation apparatus for distilling salt water or polluted water into drinking water and simultaneously producing hot water. The present invention more particularly relates to a system comprises a distillation apparatus including a heat source, an evaporation and condensation chamber, a hot water tank and a distillate tank that are thermally connected.

The hot water and distillation apparatus according to the invention may in particular be adapted for decentralised domestic use (e.g. in private buildings), remote areas and other places where the only (or very expensive) drinking water is available in bottles.

PRIOR ART

In most areas of the world, there is an increasing need for clean drinking water. Various attempts have been made to provide easy access to drinking quality water. However, one of the main challenges associated with most solutions is the demand of an external power supply to drive pumps or other required power consuming units.

One of the alternative solutions is to use solar power to clean local water via distillation. Distillation may be applied to gain drinking water from polluted water or salt water.

However, most prior art solar distillation systems are either simple and ineffective, or technically complex and just a bit more effective.

Solar hot water systems based on the thermosyphon principles are available on the market today and can be delivered by several suppliers. Regardless of brand and construction (flat plate solar collectors or vacuum tube collectors), they all risk boiling if the owner does not use water for longer periods, which potentially will harm and stress the construction.

AU 2011211830 B2 discloses a system for distilling water into drinking water and simultaneously producing hot water without requirement of any external power supply.

The system comprises a solar heat collection panel in fluid communication with an evaporation tank comprising an evaporation chamber and a condensation wall. The solar heat collection panel heats water that enters an upwardly open container body arranged in the evaporation tank from which the water evaporates. The water evaporates from the opening in the container body and will condense on a concave condensation wall arranged above the upwardly open container body. The distilled water is collected in the bottom of the evaporation chamber and is drained away through a pipe in the bottom of the evaporation chamber.

The condensation of the water is provided by heat exchange between a hot water reservoir tank disposed at a position higher than and close to the evaporation tank. Stored water within the hot water reservoir tank becomes hot water by exchanging heat with the evaporated hot water of the evaporation tank.

It is a disadvantage that the condensed water can drip directly into the opening in the container body and thus introduce a risk of splashing contaminated water from the container body into the distilled water.

Therefore, it is an object of the present invention to provide an apparatus that eliminates the risk of contaminating the distilled water with polluted or contaminated water.

The prior art system is rather large and thus it would be advantageous to be able to provide a more compact system. It is an object of the present invention to provide a compact apparatus.

The prior art system cannot be cleaned. Therefore, it is also an object to provide an apparatus that can be cleaned.

CN201259340 discloses a similar system with a lower tank of feed water to be distilled, a higher tank for bathing water and in between, a drip tray to collect the distillate.

It is a disadvantage that the lower feed water tank is relatively large. Since evaporation is the driving force, there is a lot of water to be heated before the system will start to work at a high (close to boiling) temperature. As the temperature rises, the evaporation follows—and when considering the amount of energy that any solar collector can produce—it is unlikely that both heating up to the boiling point and providing energy for evaporation too (approximately 9 times as energy demanding as heating) can be achieved with a solar collector aperture of approximately 1 to 2 square metres, which is the size for such a system. It is likely that such a system only will be able to make 3-6 litres of distillate per 24 hours.

It is not possible to clean the solar collector due to the fact that it is permanently closed. This is a major disadvantage, because one must expect different types of feed water to enter the system. If the distillate is intended for drinking, cleaning of the system is required.

It is also a disadvantage that the disclosed system allows the feed water to circulate between the evaporation chamber and into the solar collector. This will harm any solar collector when aggressive water is being circulated and cleaning of the disclosed system seems impossible.

It is an object of the invention to provide a hot water and distillation apparatus having an enhanced gained output ratio of distilled water.

In addition, it is an object of the invention to provide a hot water and distillation apparatus having an improved durability and rigidity compared to the prior art of hot water and distillation apparatuses.

DE102008052964A1 discloses a water distillation plant that comprises solar collectors configured to deliver thermal energy for operating an evaporator and a condenser connected with the evaporator. The plant comprises a pre-heater for preheating the water to be distilled supplied to the evaporator. Each solar collector is provided with an absorber, and a liquid-filled metal tube, which is heat-conductively connected with the absorber and extends in a longitudinal direction of the housing.

It is a further object of the invention to provide a hot water and distillation apparatus allowing for easy maintenance and cleaning.

Furthermore, it is an object of the invention to provide a hot water and distillation apparatus that eliminates the risk of contamination of the distilled water. Furthermore, it is an object to provide a hot water and distillation apparatus that can be driven by means of different energy sources.

As the prior art solutions apply pipe structures to provide fluid communication and thus heat exchange between different sections, it is also an object of the present invention to provide a solar hot water and distillation apparatus that is less complicated and does not require the aforementioned pipe structures.

SUMMARY OF THE INVENTION

The object of the present invention can be achieved by an apparatus as defined in claim 1. Preferred embodiments are defined in the dependent sub claims, explained in the following description and illustrated in the accompanying drawings.

The hot water and distillation apparatus according to the invention is configured to simultaneously produce distilled water and hot water. The hot water and distillation apparatus comprises:
- a hot water tank;
- a condensation and evaporation chamber;
- an (feed water) evaporation tray provided in the condensation and evaporation chamber;
- a heat source thermally connected to the evaporation tray, wherein the hot water and distillation apparatus is configured to condensate evaporated feed water from the evaporation tray by means of heat exchange between the hot water tank and a condensation surface, wherein the condensation surface is provided at the outside surface of the hot water tank, wherein the heat source is thermally connected to the evaporation tray, wherein the hot water and distillation apparatus comprises a distillate collection member configured to collect distillate, wherein the hot water tank, the evaporation tray and the distillate collection member are provided in the condensation and evaporation chamber.

Hereby, it is possible to provide a hot water and distillation apparatus that is easy to produce and cost-efficient.

Furthermore, it is possible to provide a hot water and distillation apparatus having an enhanced gained output ratio of distilled water.

Moreover, it is possible to provide a solar hot water and distillation apparatus having an improved durability and rigidity compared to the prior art hot water and distillation apparatuses.

The hot water tank may have any suitable form and size. It may be an advantage that at least a portion of the hot water tank (e.g. the central portion of the hot water tank) is cylindrical.

In one embodiment according to the invention, the hot water tank is shaped as a coiled tube. The tube (or pipe) may be shaped by winding up the tube around a thin shaft. The use of a coiled tube provides a large condensation surface and a minimised water tank volume.

The condensation and evaporation chamber may have any suitable size and shape.

The evaporation tray is provided in the condensation and evaporation chamber, preferably in the lower portion of the condensation and evaporation chamber.

The heat source may have any suitable size and is thermally connected to the evaporation tray, and the condensation of evaporated feed water from the evaporation tray is provided by means of heat exchange between the hot water tank and a condensation surface. The heating source may be a stove or a furnace configured to burn wood, gas, oil or any other suitable fuel. The heat source may be electrical. The heat source may be a solar collector. The heat source may be a heat pump. The heat source may be heat by means of microwaves. The heat source may be any suitable heat source capable of generating heat that can be transferred to the evaporation tray.

The condensation surface is provided at the outside surface of the hot water tank. Hereby, it is possible to provide a very reliable compact solar hot water and distillation apparatus.

It is an advantage that the hot water and distillation apparatus comprises a distillate tank and that the hot water tank, wherein the evaporation tray and the distillate tank is provided in the (one and same) condensation and evaporation chamber.

Hereby, it is possible to increase the efficiency of the hot water and distillation apparatus and to provide a compact hot water and distillation apparatus.

It may be beneficial that the hot water and distillation apparatus comprises means for dispensing water from the hot water tank into the evaporation tray. Hereby, it is possible to ease the filling process. The dispensing procedure may be carried out manually or at least partly automatically, e.g. by means of sensors and one or more controllable valves.

It may be advantageous that the hot water and distillation apparatus comprises an upper portion having a front side and that the hot water and distillation apparatus comprises an overflow member provided in the evaporation and condensation chamber, wherein the overflow member is displaced relative to the centre line of the hot water tank towards the front side of the upper portion.

Hereby, it is possible to provide a hot water and distillation apparatus that eliminates the risk of contamination of the distilled water.

Since distillate condensing on the condensation surface of the hot water tank will drip off the condensation surface of the hot water tank at the lowest point of the hot water tank, the distillate will drip into the distillate tank and not into the overflow tray.

It may be beneficial that the hot water and distillation apparatus comprises an upper portion arranged on the top of a lower portion, wherein the upper portion comprises the condensation surface, wherein the heat source is detachably attached to the upper portion.

Hereby, it is possible to provide a hot water and distillation apparatus that is easy to maintain and clean.

It may be beneficial that the hot water tank is formed and positioned in the condensation and evaporation chamber in such a manner that the vapour from the evaporation tray is forced to flow one predefined way around the hot water tank, wherein the vapour initially flows through a relatively wide passage followed by a gradually narrower passage while moving along the outer surface of the hot water tank.

Hereby, it is possible to create a so-called venture effect and chimney effect increasing the speed of the vapour and thus the distillate production speed.

It may be an advantage that at least the central portion of the top portion of the evaporation and condensation chamber is cylindrical (having a circular cross-sectional area) and that the hot water tank is cylindrical (having a circular cross-sectional area), wherein the hot water tank is arranged eccentrically relative to the evaporation and condensation chamber.

It may be advantageous that the distillate tank is open and in fluid communication with the evaporation and condensation chamber and that the distillate tank is part of the condensation surface.

It may be an advantage that the heat source is configured to be arranged inside a socket placed inside the evaporation tray and that the socket is positioned in the upper half portion of the evaporation tray.

In this way, it is possible to create heat layering of the feed water in the evaporation tray. The feed water intended to be distilled is distributed in the evaporation tray on the basis of temperature. The hottest water is kept at the surface (top level) while gradually colder temperature layers are provided under the surface layer.

It may be beneficial that the socket forms a dry connection between the evaporation tray and the heat source (e.g. a solar collector).

Hereby, it is possible to replace the heat source (e.g. a solar collector) without emptying the system (hot water and distillation apparatus) for fluids.

In case the heat source is a solar collector, it may be beneficial that the solar collector is configured to at the same time transferring thermal energy to both the feed water and to the coldest and less humid air in the evaporation and condensation chamber.

The hot water and distillation apparatus according to the invention is a stand-alone hot water and distillation apparatus that is operated by a suitable heat source (e.g. without any energy supply other than solar energy).

The hot water and distillation apparatus according to the invention is providing an enhanced evaporation and condensation compared to prior art.

The hot water and distillation apparatus according to the invention is providing:
Quick heating of feed water;
Controlled vapour distribution;
High speed in transport of vapour in a "one-way circular motion";
Reduced pressure in the evaporation and condensation chamber and
A compact solution.

The hot water and distillation apparatus according to the invention is capable of reaching high temperatures very quickly. In order to have an efficient process, the water vapour must have a sufficiently high thermal energy. Preferably, the temperature of the vapour is close to 100° C. or slightly above. Therefore, the feed water volume in the system shall be reduced to a minimum. Accordingly, the boiling point is achieved faster and the energy can be used for evaporation instead of heating water.

Hours of waiting to achieve temperatures close to boiling is inefficient in such a system, and heated water during daytime in a large feed water reservoir is rapidly cooled through evaporation. Accordingly, no significant distillation takes place.

The hot water and distillation apparatus according to the invention provides a controlled vapour distribution. The vapour traveling from the evaporation tray to the condensation surface must be controlled, so that no chaos or mix allows relatively dehumidified vapour to mix with and absorb water from fully saturated vapour. If this happens, the production ratio will increase dramatically.

The hot water and distillation apparatus according to the invention provides a one-way circulation of vapour starting with fully saturated water vapour rising in upward direction. Hereafter the vapour continues round along the outer surface of the hot water tank.

This one-way circulation of the vapour in the hot water and distillation apparatus according to the invention is effectively moving the vapour from the evaporation surface of the evaporation tray to the condensation surface. It may be assumed that the vapour at a given temperature is 100% saturated at the surface at the evaporation tray. While the vapour moves around the hot water tank, the content of water in the vapour decreases. When the vapour and air has moved along the periphery of the hot water tank and returns to the evaporation surface of the evaporation tray, the vapour and air will be re-saturated at the surface at the evaporation tray.

The travel speed of the vapour in the hot water and distillation apparatus is essential for the distillate production. The more vapour that is being moved from the hot water tank to the condensation chamber, the higher production rate will be expected.

The hot water and distillation apparatus according to the invention provides a controlled (thermodynamic) transportation of vapour from the evaporation tray to the condensation surface provided in a one-way only and circular flow direction. Re-heating of the dehumidified vapour will take place before renewed absorption of water is accomplished whilst passing the evaporation tray.

It is important that energy is not only transferred to the feed water in the evaporation tray, but also to the vapour and air inside the evaporation chamber. A high efficiency of evaporation is obtained by using limited energy for heating the feed water to high temperatures (due to the small volume of feed water), keeping high temperatures in the feed water and additionally heating the air in the evaporation chamber to bring down the relative humidity at a point at which the vapour is coldest and has minimum water content. To achieve this, the heat source is both heating up the feed water and the air stream in the hot water and distillation apparatus according to the invention.

In one preferred embodiment of the hot water and distillation apparatus according to the invention, the heat source is a solar collector, wherein the end of the solar collector's heat transfer unit is arranged in such a manner that the thermal energy is transferred to both the feed water and the airstream passing by. It may be beneficial that the solar collector is thermally connected to the evaporation tray without being in fluid communication with the evaporation tray.

In other embodiments, other (alternative) structural elements can be used to heat the airstream. Such structural elements may include a dedicated solar collector for air heating or another heat source. Regardless of the type applied, the energy shall be added to the coldest and most dehumidified air in the system. The coldest and most dehumidified air in the system will typically be located in the area close to the lower portion of the hot water tank. As the air will be cooled down and dehumidified along its travel path around the hot water tank, the temperature and humidity of the air will decrease gradually.

The hot water and distillation apparatus according to the invention has an open distillate collection tank as part of the evaporation and condensation chamber. Hereby is achieved a larger condensation area and a system less prone to biofouling over time, due to the high and somewhat sterilizing temperatures in such a system.

The speed of the one-way water vapour transport around the hot water tank is further enhanced by arranging the hot water tank eccentrically relative to the surrounding insulation. Hereby, it is possible to create a so-called venture effect and chimney effect. The vapour initially flows through a relatively wide passage followed by a gradually narrower passage while moving along the outer surface of the hot water tank.

The hot water and distillation apparatus according to the invention comprises a relatively small evaporation surface compared to the condensation surface. Furthermore, the system may be air and vapour tight relative to the surroundings.

When thermal energy is added to the system, a pressure drop will be observed due to the off balance in evaporation and condensation surfaces. A small pressure drop will lower the boiling point of water and cause a higher transport of vapour in the system, which will cause a higher yield.

When distilled water is tapped from the system, the pressure will normalize to the ambient pressure.

What is new is a design, where the distillate tank is in open and fluid connection with the evaporation and condensation chamber.

The hot water and distillation apparatus according to the invention may comprise a distillate that is kept in an air tight tank inside the system. The temperature in the evaporation and condensation chamber and therefore also in the distillate tank will for 6-10 hours per normal day be close to 100° C. and will therefore keep the biofouling of the system to a minimum and give better (drinking) water quality over time.

In case the heating source is of a solar type, thermal solar collector types comprising vacuum tubes, preferably comprising heat pipes may be applied. Any suitable type of thermal solar collector may be used. In a preferred embodiment of the invention, there is a dry connection to the evaporation tray. This means that the inside of a solar collector is not affected by the evaporation tray. It is possible to change tubes without spilling feed water. Moreover, the system will run regardless of if a number of tubes are malfunctioning.

In the hot water and distillation apparatus according to the invention, the evaporation tray is most often the only part that requires cleaning. For cleaning of the evaporation tray, an opening is provided for mechanical cleaning and emptying the brine. It can be beneficial that the hot water and distillation apparatus according to the invention is compact and comprises as little air in the evaporation and condensation chamber as possible.

It may be an advantage that the hot water and distillation apparatus according to the invention has a corrugated hot water surface to increase the condensation area.

It may be advantageous that the hot water and distillation apparatus according to the invention comprises means for opening both the condensation and evaporation chamber for cleaning the feed water tray.

It may be an advantage that the hot water and distillation apparatus according to the invention comprises electrical means for keeping the evaporation tray full, e.g. in the form of a float sensor or a level sensor and solenoid valve connected to a photovoltaic solar panel.

It may be beneficial that the hot water and distillation apparatus according to the invention comprises electrical means for periodically emptying the evaporation tray to keep the contents of solids as little as possible over time.

It may be advantageous that the hot water and distillation apparatus according to the invention comprises at least one, preferably a plurality of evaporation wicks provided in the top portion of the evaporation tray, where the evaporation wicks are configured to increase the surface area of the feed water and hereby facilitate an enhanced evaporation capacity.

It may be beneficial that the hot water and distillation apparatus according to the invention has an evaporation tray made of heat resistant, waterproof and non-corrosive material, such as glass, enamel, composite, metal or ceramic material. Hereby, it is possibly to extend the service life of the feed water tray, even if the feed water is abrasive (e.g. seawater).

It may be an advantage that the hot water and distillation apparatus according to the invention comprises an electrical heater for night-time or cloudy day production of hot water and distilled water.

It may be advantageous that the hot water and distillation apparatus according to the invention comprises electrical or mechanical means for creating a small pressure drop in the evaporation/condensation chamber to lower the boiling point, enhancing air speed and thereby the condensation velocity.

It may be beneficial that the volume of the distillate tank is relatively large and capable of holding volume corresponding to a number of days' distillate water production.

In case the heating source is a solar collector, it may be an advantage that the hot water and distillation apparatus according to the invention is provided without insulation in the distillate tank, so that cooling initiated by low ambient temperatures in the shadow, opposite the solar collector, will bring the temperatures down and thus further facilitate condensation in the evaporation and condensation chamber.

It may be beneficial that the hot water and distillation apparatus according to the invention comprises one or more filters (such as UV-filters, carbon-filters or mineral-filters) to further enhance the quality of drinking water over time.

It may be advantageous that the hot water and distillation apparatus according to the invention comprises means for filling bottles with drinking water.

It may be beneficial that the hot water and distillation apparatus according to the invention comprises means suitable for direct tube connection for in-house drinking water tap.

It may be an advantage that the hot water and distillation apparatus according to the invention comprises means for connection of two or more systems provided in parallel or serial configurations.

In case the heating source is a solar collector, it may be advantageous that the hot water and distillation apparatus according to the invention comprises means for adjusting the angle of the solar collector in order to optimise the inclination for gaining most solar energy.

It may be beneficial that the hot water and distillation apparatus according to the invention comprises security valves configured to open in case of elevated pressure.

It may be advantageous that the hot water and distillation apparatus according to the invention comprises means for pipe connections for ensuring that distillate can be tapped inside a house by gravity (the system is on the roof) or via a pump (the system is level or under tap height).

It may be beneficial that the hot water and distillation apparatus according to the invention is made of UV-proof materials that are sturdy and configured to outlast rough weather.

It may be an advantage that the heat source is electrical. Hereby, drinking water can be produced in an easy manner in areas with electricity but without access to drinking water.

It may be beneficial that the distillate collection member is configured to collect distillate and comprises an inclined plate-shaped structure. Hereby, the distillate can be transported by gravity.

It may be beneficial that a level sensor is arranged in the evaporation tray. Hereby, the water level of the evaporation tray can be detected and used to control water delivery to the hot water tank.

It may be beneficial that the hot water and distillation apparatus comprises an inlet pipe arranged and configured to fill water into the hot water tank, wherein the hot water and distillation apparatus comprises a pipe extending between the inlet pipe and the evaporation tray, wherein a valve is arranged at the pipe extending between the inlet pipe and the evaporation tray. Hereby, the flow of water in the hot water tank can be controlled by means of the valve.

It may be an advantage that the overflow member is a pipe arranged in the evaporation tray. Hereby, it is possible to produce an efficient overflow member in an easy manner.

DESCRIPTION OF THE DRAWINGS

The invention will become more fully understood from the detailed description given herein below. The accompanying drawings are provided by way of illustration only, and thus, they are not limitative of the present invention. In the accompanying drawings:

FIG. 5A shows a side view of a solar hot water and distillation apparatus according to the invention;

FIG. 5B shows a perspective view (seen from above) of the solar hot water and distillation apparatus shown in FIG. 5A;

FIG. 10A shows a schematic view of a hot water and distillation apparatus, wherein the hot water tank is shaped as a coiled tube;

FIG. 10B shows a schematic view of a hot water and distillation apparatus according to the invention;

DETAILED DESCRIPTION OF THE INVENTION

Figure 1:
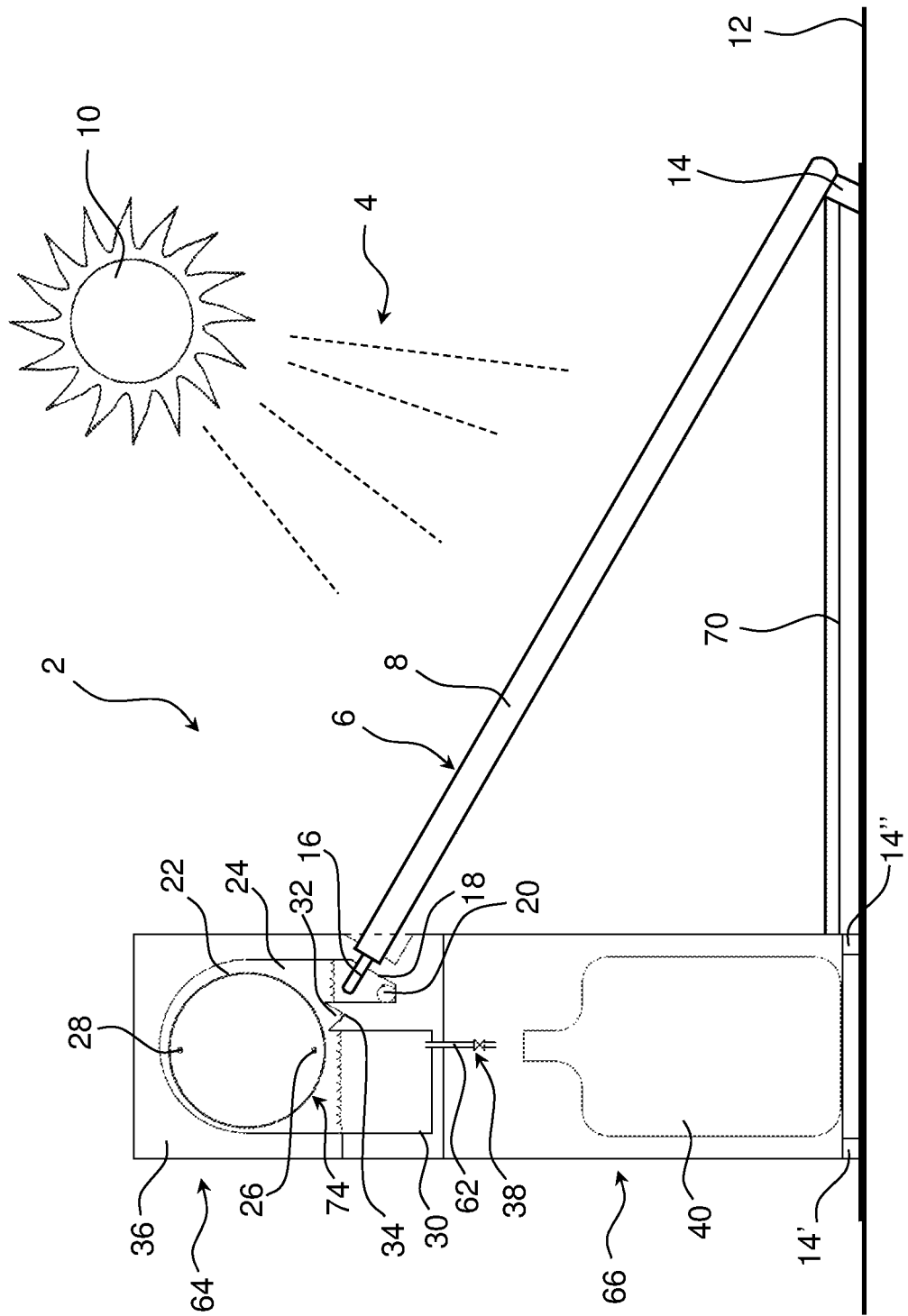
FIG. 1 shows a schematic cross-sectional end view of a solar hot water and distillation apparatus according to the invention.

Referring now in detail to the drawings for the purpose of illustrating preferred embodiments of the present invention, a solar hot water and distillation apparatus 2 of the present invention is illustrated in FIG. 1.

FIG. 1 is a schematic side view of a solar hot water and distillation apparatus (also referred to as solar apparatus) 2 according to the invention. The solar hot water and distillation apparatus 2 comprises a solar collector 6 provided with a plurality of parallel vacuum tubes 8 arranged in a support 14 configured to receive and hold the closed ends of the vacuum tubes 8 fixed relative to each other. The support 14 is resting on the ground 12.

The solar collector 6 is arranged inside a socket 16 placed inside an evaporation tray 18. Heat energy 4 originating from the sun 10 is transferred from the solar collector 6 to the evaporation tray 18.

The solar hot water and distillation apparatus 2 comprises an upper portion 64 and a lower portion 66. The lower portion 66 is equipped with support members 14', 14" resting on the ground 12.

The socket 16 may be formed as either a tube welded to the sides of the evaporation tray or as a closed tube with an inner diameter that fits the solar collector's heat pipe bulb. The welding should be watertight. In one embodiment according to the invention, a perfect fit is provided between the socket 16 and the solar collector 6. Alternatively, it is possible to apply a heat conductive compound (not shown) in order to optimise the transfer of heat energy 4. The socket 16 forms a dry connection between the evaporation tray 18 and the solar collector 6, allowing change without emptying the system (solar hot water and distillation apparatus) 2 for fluids.

The evaporation tray 18 contains feed water that is intended to be distilled. In order to ensure a high capacity of the distillation apparatus 2, the evaporation tray 18 is provided with a built-in cavity for receiving an electrical heater (not shown) as a supplementary heater. During cloudy days, a supplementary heater may be needed in order to produce the required quantity of hot water or distillate water.

The socket 16 arranged in the evaporation tray 18 is positioned in the upper half portion of the evaporation tray 18. In this way, it is possible to create heat layering of the feed water in the evaporation tray 18. The feed water intended to be distilled is distributed in the evaporation tray 18 on the basis of temperature. The hottest water is kept at the surface (top level) while gradually colder temperature layers are provided under the surface layer.

In the ends of the evaporation tray 18, preferable in both ends, an inspection and cleaning opening 20 is provided. In one embodiment according to the invention, the evaporation tray 18 is configured to contain 5 to 20 litres. It may be an advantage that the evaporation tray 18 is configured to hold the smallest volume allowing the filling mechanism to work. In one embodiment, the evaporation tray 18 is configured to hold about 5 litres.

It may be an advantage to make the evaporation tray 18 as small as possible to ensure fast heating of the feed water in the evaporation tray 18. The volume of the evaporation tray 18 may be chosen to correspond to the expected daily amount of distillate or in that range.

A typical system according to the invention may contain a solar collector having 15-20 vacuum type solar collector tubes 8. Such a system 2 may comprise a 150-200 litres hot water tank 22, and have a daily distillate production capacity in the range of 10 to 20 litres.

The hot water tank 22 comprises an inlet port 26 for filling cold water and an outlet port 28 for tapping hot water. The inlet port 26 is provided in a lower position than the outlet port 28. The outside surface of the hot water tank 22 is condensation surface 74.

An outlet pipe 62 is provided in the bottom portion of the distillate tank 30. The outlet pipe 62 is provided with a valve 38 configured to tap distillate from the distillate tank 30 into a bottle 40 like the one arranged in the lower portion 66 of the solar apparatus 2.

Figure 2:
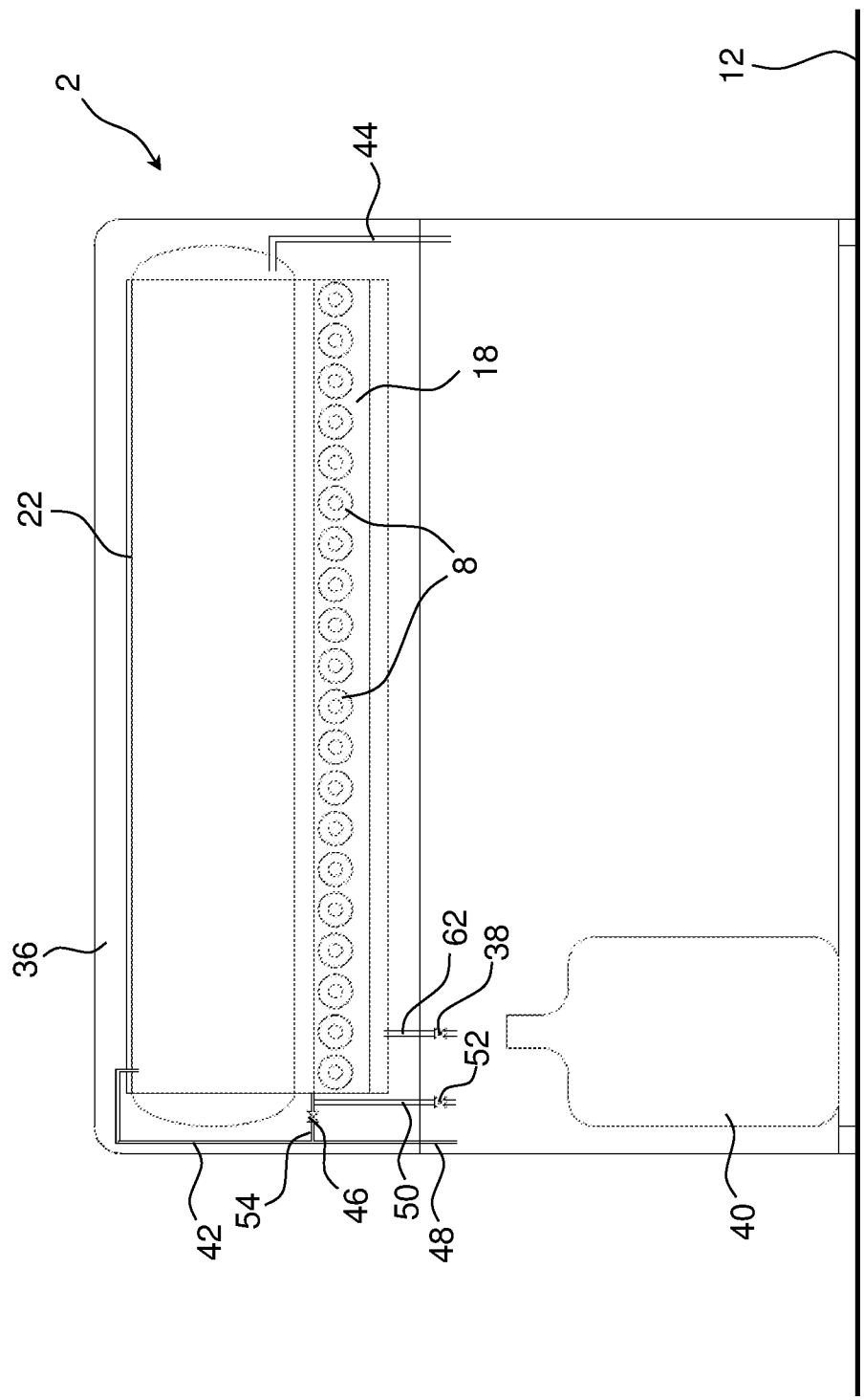
FIG. 2 shows a schematic cross-sectional front view of the solar hot water and distillation apparatus shown in FIG. 1.

FIG. 2 illustrates a schematic cross-sectional front view of the solar hot water and distillation apparatus 2 illustrated in FIG. 1. The evaporation tray 18 is in fluid communication with the hot water tank 22. The hot water tank 22 is enclosed by insulation 36.

Filling and refilling of the evaporation tray 18 can be accomplished by using water from the hot water tank 22. An outlet pipe 42 is provided at the upper portion of the hot water tank 22. Accordingly, the hottest water in the hot water tank 22 will be discharged through this outlet pipe 42. A connection pipe 54 connects the outlet pipe 42 and the evaporation tray 18. An inlet pipe 44 is connected to the lower portion of the hot water tank 22. This inlet pipe 44 may be applied to fill water into the hot water tank 22.

A valve 46 is provided between the outlet pipe 42 and the connection pipe 54. Filling of the evaporation tray 18 can be controlled (regulated) by means of this valve 46. Filling of the evaporation tray 18 (with water from the hot water tank 22) may be conducted manually or by using electrical means (not shown). The electrical means may include a level sensor and a solenoid valve, which may be energised by a photo-voltaic module (not shown) or by another electrical energy source.

A tapping pipe 48 is connected to the outlet pipe 42. Further, an outlet pipe 50 is connected to the connection pipe 54. A valve 52 is provided in the distal end of the outlet pipe 50.

An outlet pipe 62 extends from the bottom surface of the evaporation tray 18. A tapping valve 38 is provided at the distal end of the outlet pipe 62.

It can be seen that twenty vacuum tubes 8 are evenly distributed along a horizontal line through the evaporation tray 18.

Figure 3:
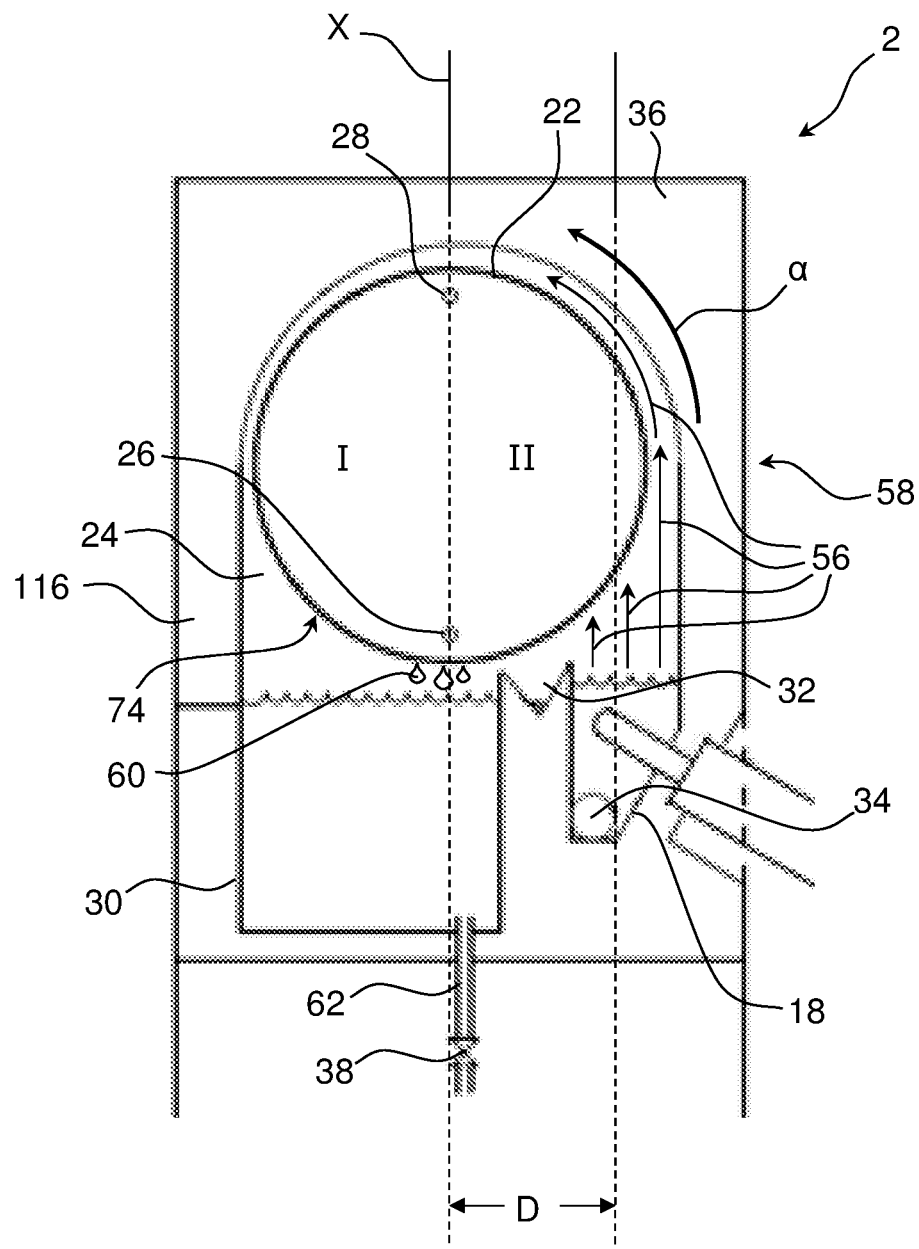
FIG. 3 shows a close-up view of the upper portion of the solar hot water and distillation apparatus shown in FIG. 1.

FIG. 3 illustrates a close-up view of the central parts of the solar hot water and distillation apparatus 2 illustrated in FIG. 1. The hot water tank 22 comprises a first half I and a second half II like indicated in FIG. 3. The evaporation tray 18 is displaced radially relative to the lowest point (centre) of the hot water tanks 22. The displacement D is illustrated in FIG. 3. Therefore, the evaporation tray 18 is provided below the second half II of the hot water tank. Accordingly, the water vapour 56 (due to convection) will have preferred movement direction α along the outside surface of the hot water tank 22. The dominating movement direction α, which is counterclockwise, is indicated in FIG. 3.

The hot water tank 22 is arranged inside the evaporation and condensation chamber 24. In a preferred embodiment of the invention, the hot water tank 22 is arranged in such a manner that the major portion (volume) of the evaporation and condensation chamber 24 is provided above the evaporation tray 18. The evaporation and condensation chamber 24 comprises a vacuum pump 116 arranged to evacuate the evaporation and condensation chamber 24. One may supply the vacuum pump 116 with electrical energy produced by a photo-voltaic solar collector (not shown). The profile of the evaporation and condensation chamber 24 facilitates generation of a so-called "chimney effect" and "venturi effect" which determines the direction and speed of air and vapour 56 flowing along the outside surface of the hot water tank 22.

The hot water tank 22 is fitted with an inlet port 26 for filling colder water and an outlet port 28 for tapping hotter water. The inlet port 26 is provided in a lower position than the outlet port 28. In this way, it is possible to facilitate generation of heat layers (layered heat zones) in the hot water tank 22. The temperature level and the temperature difference between the air and vapour 56 in the evaporation and condensation chamber 24 and the hot water tank 22 is a major determinant of the distillation speed (and thus distillation capacity) of the system 2.

An overflow tray 32 is provided in the evaporation and condensation chamber 24. The overflow tray 32 is displaced relative to the centre line X of the hot water tank 22 towards the front side 58 of the upper portion 64. Since distillate condensing on the condensation surface 74 of the hot water tank 22 will drip off the condensation surface 74 of the hot water tank 22 at the lowest point of the hot water tank 22, the distillate will drip into the distillate tank 30 and not into the overflow tray 32.

In one embodiment according to the invention, the distillate tank 30 is capable of containing the distillate produced during several days. In this way, the distillate tank 30 works as a drinking water buffer tank. A level sensor (not shown) can be provided to detect and display the quantity of produced distillate (ready for consumption).

On the bottom part of the distillate tank 30, a pipe 62 is provided. A valve 38 is arranged at the pipe 62 in order to ease filling of drinking water bottles. It is possible to connect the distillate tank 30 to water coolers or taps in a building through a pipe system.

The insulation 36 of the system may be made of a 2-30 cm, preferably 5-15 cm insulation material, such as mineral wool fibre including stone wool fibre, and glass wool fibre, polyurethane foam (PU-foam), aerogel or other means of thermal insulation, including vacuum.

In a preferred embodiment, the hot water tank 22 is made of enameled steel or stainless steel. The hot water tank 22 may be pressurised. The tank 22 can be provided with an internal heat exchanger (not shown) for extracting heat energy (e.g. for hot bathing water). The hot water tank 22 may comprise internal thermal layering devices in the form of horizontally extending sheets configured to restrict or reduce mixing of water layers of different temperatures.

Condensation in a fully saturated environment starts at a very low temperature difference. In fact, in a fully saturated environment, condensation is detectable at temperature differences about 3° C. The higher temperature difference, the higher condensation rate will be expected. Further, evaporation speed is by nature determined by temperature. When scaling the evaporation and condensation chamber 24, it is essential to make sure to provide a balance between the evaporation surface and the condensation surface.

The overflow tray 32 is arranged between the evaporation tray 18 and the distillate tank 30. The overflow tray 32 is provided with an outlet opening 34 configured to create fluid communication to the ambient environment or to a collection tank (not shown) arranged at a lower position than the overflow tray 32. Hereby, discharge of water (overflow) can be driven by using gravity.

The overflow tray 32 is formed as a gutter which can receive water from both the evaporation tray 18 and distillate tank 30 in case of overflow. The outlet opening (connection) 34 may be in fluid connection with a drain, a U-shaped or S-formed water lock placed under the outlet opening 34. The water lock will allow the presence of a low-pressure environment (vacuum) in order to enhance the productivity of the solar apparatus 2 according to the invention.

Under normal conditions, the atmospheric pressure in the condensation and evaporation chamber 24 may correspond to the ambient pressure. This pressure in the condensation and evaporation chamber 24 is created by the partial pressure of water vapour and released oxygen, nitrogen and carbon dioxide from the feed water. If the condensation and evaporation chamber 24 is evacuated—even the smallest bit—the efficiency of the solar hot water and distillation apparatus 2 will be increased, because the boiling temperature of the feed water will be reduced. Therefore, it is an advantage to reduce the pressure in the condensation and evaporation chamber 24 through an off balanced ratio between evaporation surface and condensation surface.

Figure 4:
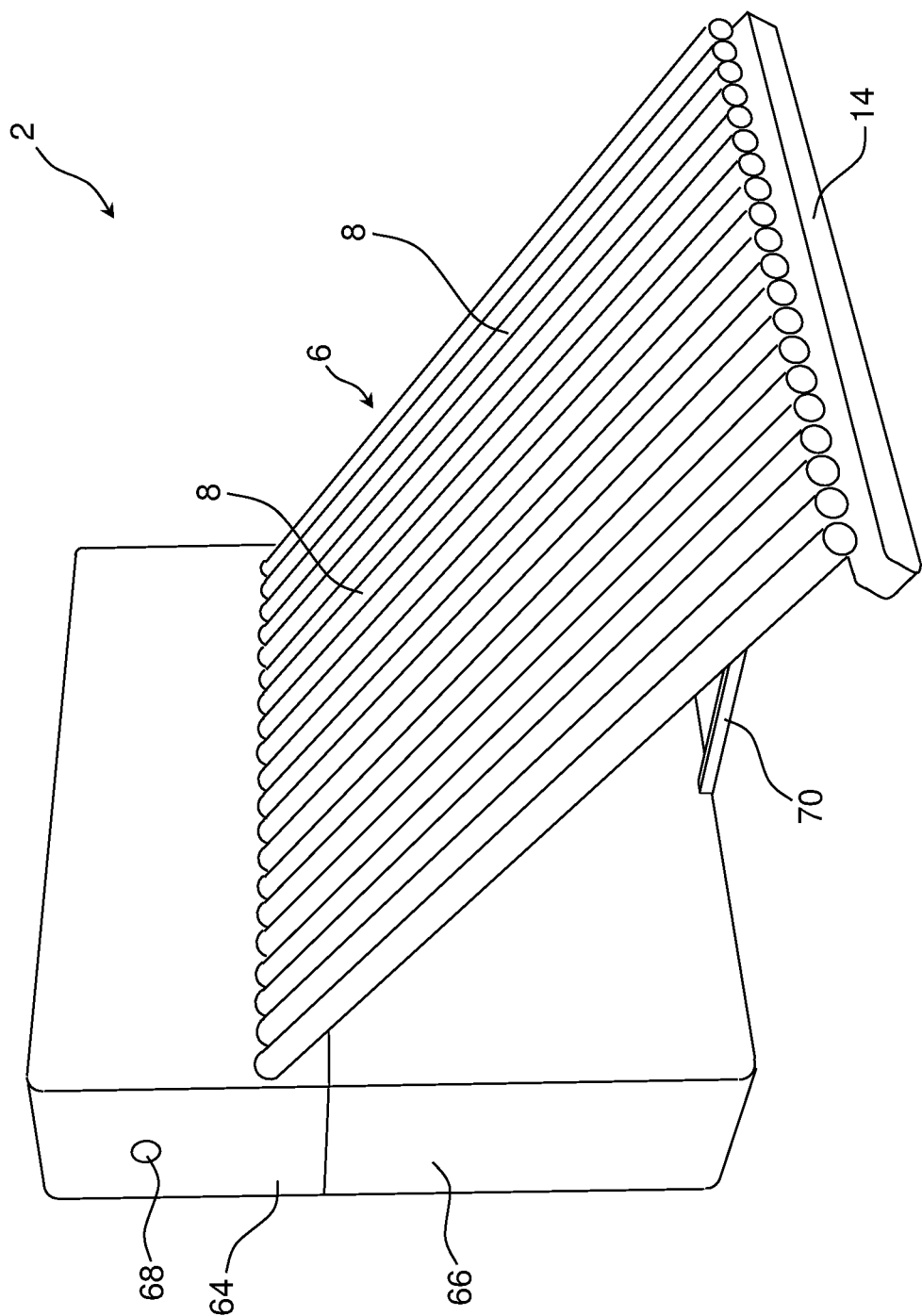
FIG. 4 shows a perspective view of a solar hot water and distillation apparatus according to the invention.

FIG. 4 illustrates a perspective view of a solar hot water and distillation apparatus 2 according to the invention. The solar hot water and distillation apparatus 2 comprises a solar collector 6 comprising 20 vacuum tubes 8 extending parallel to each other.

The solar hot water and distillation apparatus 2 comprises a box member comprising an upper portion 64 arranged on the top of a lower portion 66. A connection 68 is provided in the upper portion 64. The connection 68 may provide access to the upper portion 64 e.g. for inspection.

The distal end of the vacuum tubes 8 is closed and rests on a support 14. The support 14 is mechanically connected to the bottom part of the lower portion 66.

FIG. 5 A illustrates a side view of a solar hot water and distillation apparatus 2 according to the invention. FIG. 5 B shows a perspective view (seen from above) of the solar hot water and distillation apparatus shown in FIG. 5 A.

The solar hot water and distillation apparatus 2 comprises a solar collector 6 comprising 16 vacuum tubes 8 arranged side by side in a manner in which the tubes extend parallel to each other.

The solar hot water and distillation apparatus 2 comprises a box member comprising an upper portion 64 attached to a lower portion 66. A connection 68 is provided in the upper portion 64.

The distal ends of the vacuum tubes 8 are closed, and the vacuum tubes 8 rest on a support 14 mechanically connected to the bottom part of the lower portion 66.

Figure 6:
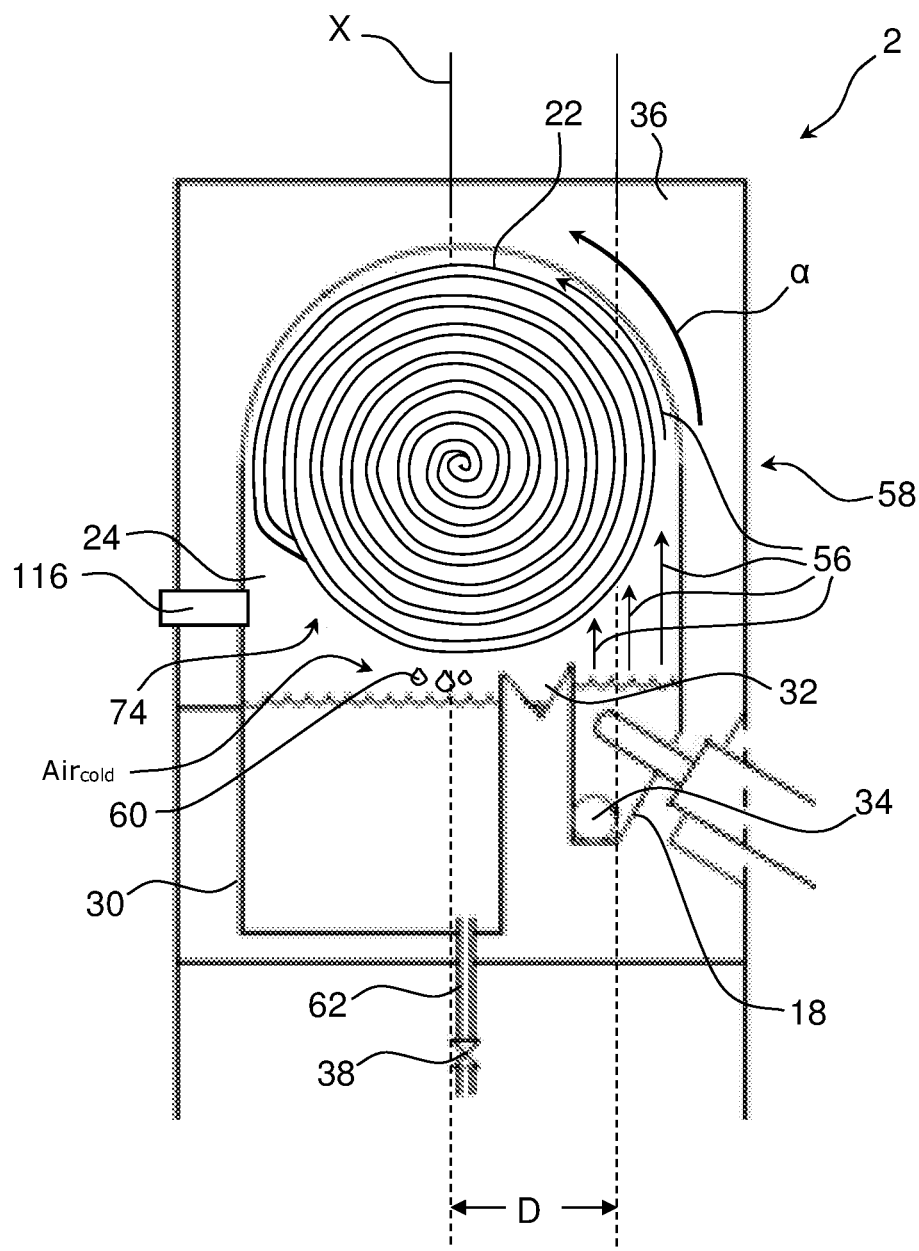
FIG. 6 shows a solar hot water and distillation apparatus as shown in FIG. 3, wherein the hot water tank has been replaced with a hot water tank shaped as a coiled tube.

FIG. 6 illustrates a solar hot water and distillation apparatus 2 almost similar to the one shown in FIG. 3. The hot water tank 22 has been replaced with a hot water tank 22 shaped as a coiled tube. Hereby, it is possible to provide a large condensation surface 74 and at the same time minimise the volume of the hot water tank 22. The hot water tank 22 is shaped as a coiled tube.

The hot water tank 22 shaped as a coiled tube is arranged eccentrically relative to the cylindrical top portion of the evaporation and condensation chamber 24 (and to the surrounding insulation 36). Accordingly, it is possible to create a so-called venture effect and chimney effect. The vapour 56 initially flows through a relatively wide passage followed by a gradually narrower passage while moving along the outer surface of the hot water tank 22.

The solar collector thermally connected to the evaporation tray 18 is configured to at the same time transferring thermal energy to both the feed water in the evaporation tray 18 and to the coldest and less humid air $Air_{cold}$ in the evaporation and condensation chamber 24. A vacuum pump 116 is arranged in the evaporation and condensation chamber 24 in order to allow for evacuation of the evaporation and condensation chamber 24. It is possible to energise the vacuum pump by a photo-voltaic solar collector.

Figure 7:
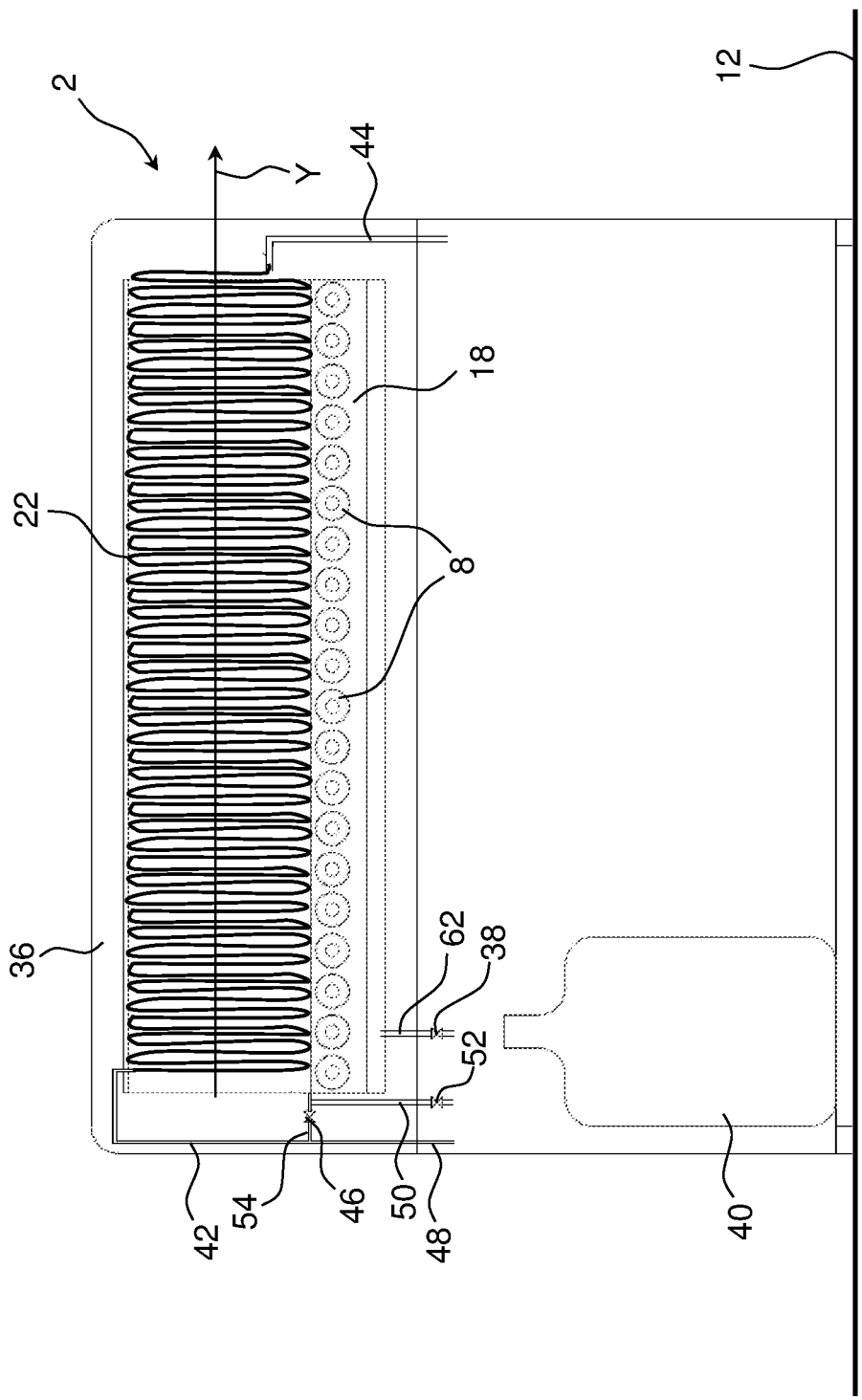
FIG. 7 shows a solar hot water and distillation apparatus like the one shown in FIG. 2, wherein the hot water tank has been replaced with a hot water tank shaped as a coiled tube.

FIG. 7 schematically illustrates a solar hot water and distillation apparatus 2 almost similar to the one shown in FIG. 2. The hot water tank 22, however, has been replaced with a hot water tank shaped as a coiled tube. The hot water tank extends along its longitudinal axis Y. The tube of the hot water tank 22 has been coiled around the central longitudinal axis Y.

The inlet pipe 44 is positioned at the lower area, whereas the outlet pipe 42 is arranged at the top portion of the hot water tank 22.

Figure 8:
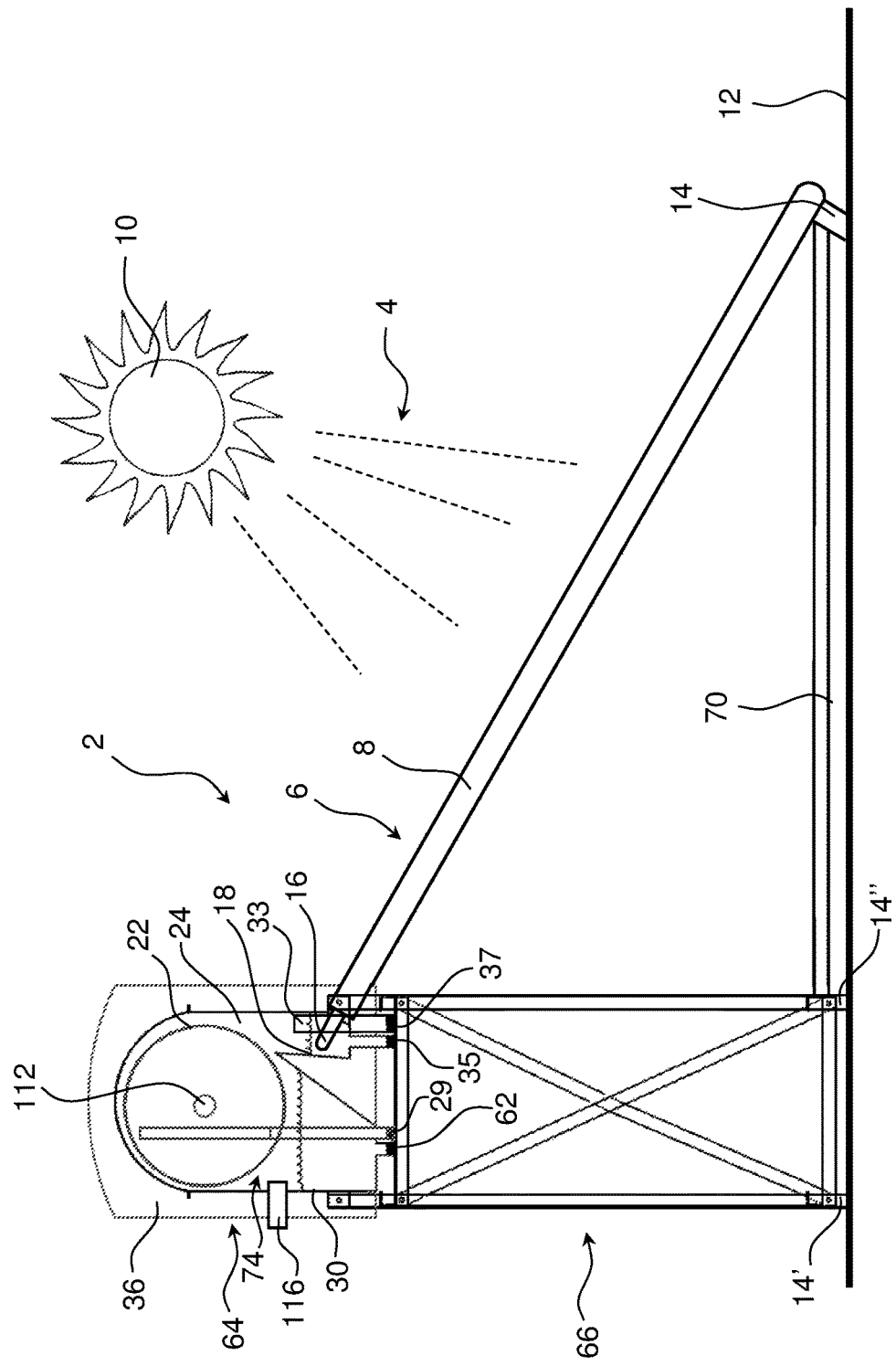
FIG. 8 shows a schematic cross-sectional end view of a solar hot water and distillation apparatus according to the invention.

FIG. 8 illustrates a schematic cross-sectional end view of a solar hot water and distillation apparatus 2 according to the invention. The solar hot water and distillation apparatus 2 basically corresponds to the one shown in FIG. 1. The solar hot water and distillation apparatus 2 comprises an upper portion 64 arranged on a lower portion 66 provided with ground engaging support members 14', 14". The lower portion 66 is shaped as a stand.

The upper portion 64 of the solar hot water and distillation apparatus 2 comprises a solar collector 6 equipped with a plurality of parallel vacuum tubes 8 arranged in a support 14 configured to receive and hold the closed ends of the vacuum tubes 8 fixed relative to each other. The support 14 rests on the ground 12.

The solar collector 6 is arranged inside a socket 16 provided inside an evaporation tray 18. Heat energy 4 originating from the sun 10 is transferred from the solar collector 6 to the evaporation tray 18.

The solar hot water and distillation apparatus 2 comprises an upper portion 64 and a lower portion 66. The lower portion 66 is equipped with support members 14', 14" resting on the ground 12.

The socket 16 forms a dry connection between evaporation tray 18 and the solar collector 6, allowing change without emptying the system (solar hot water and distillation apparatus) 2 for fluids.

The evaporation tray 18 contains feed water to be distilled. For facilitating a high capacity of the distillation apparatus 2, the evaporation tray 18 may be formed and configured to receive an electrical heater (not shown) as a supplementary heater. An overflow member 33 formed as a tube is arranged in the evaporation tray 18. An outlet 37 is provided in the end of the overflow member 33. An opening member 35 is provided in the bottom portion of the evaporation tray 18.

The socket 16 arranged in the evaporation tray 18 is positioned in the top portion of the evaporation tray 18 in order to create heat layering of the feed water in the evaporation tray 18.

It may be an advantage to minimize the size of the evaporation tray 18 in order to ensure fast heating of the feed water in the evaporation tray 18. Accordingly, the volume of the evaporation tray 18 may be chosen to correspond to the expected daily amount of distillate or in that range.

The hot water tank 22 comprises an inlet port for filling cold water and an outlet port for tapping hot water. The ports 29 cannot be distinguished in FIG. 8. The outside surface of the hot water tank 22 is configured to be a condensation surface 74.

An outlet pipe 62 is provided in the bottom portion of the distillate tank 30. The outlet pipe 62 may be provided with a valve configured to tap distillate from the distillate tank 30. The hot water tank 22 is provided with attachment structure 112 configured to engage with a corresponding structure in order to fix the hot water tank 22. The hot water tank 22, the evaporation tray 18 and the distillate tank 30 (distillate collection member) are provided in the condensation and evaporation chamber 24. A vacuum pump 116 is provided in the evaporation and condensation chamber 24 in order to allow for evacuation of the evaporation and condensation chamber 24. The vacuum pump 116 may be driven by a photo-voltaic solar collection (not shown).

Figure 9:
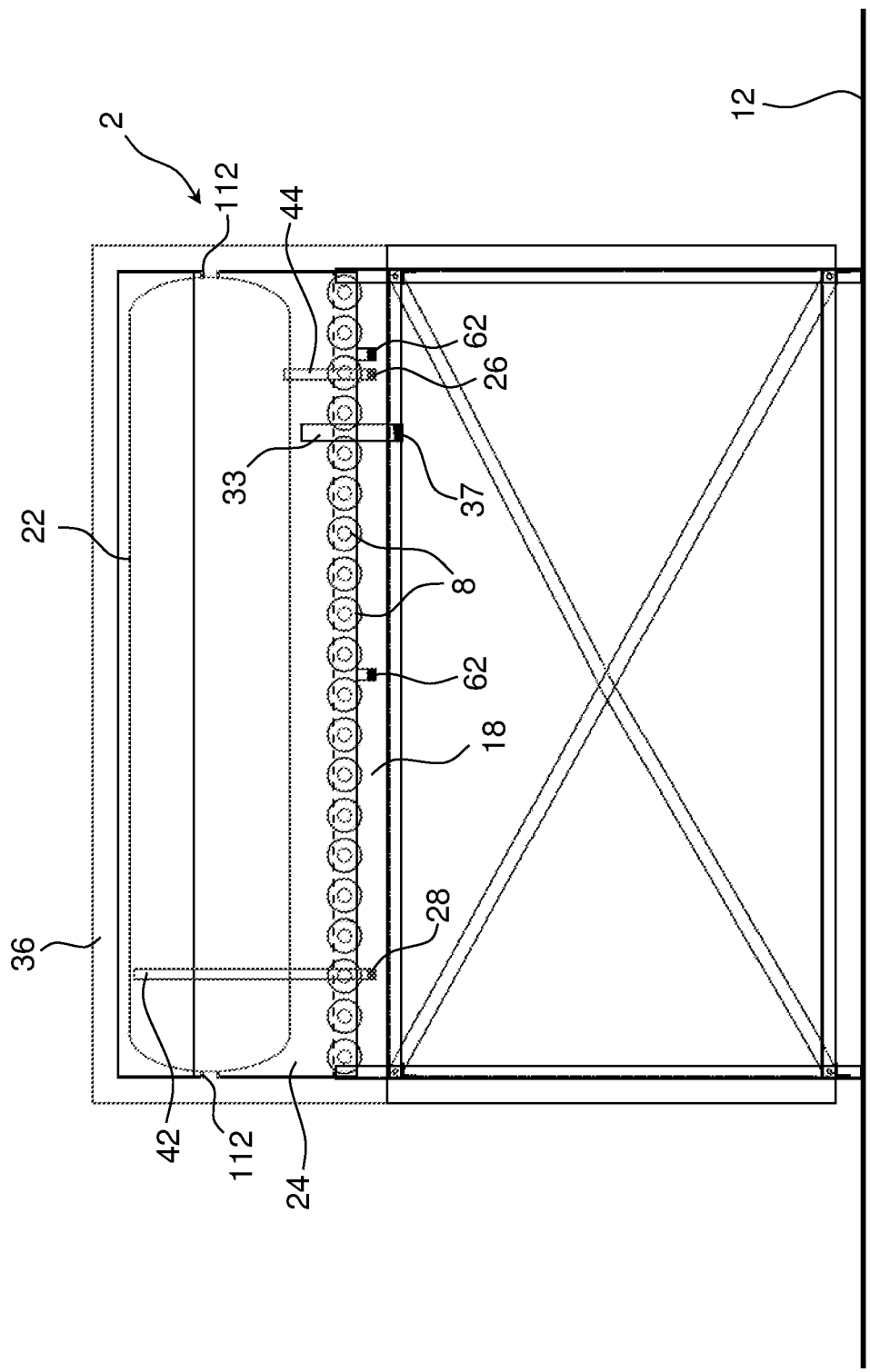
FIG. 9 shows a schematic cross-sectional front view of the solar hot water and distillation apparatus shown in FIG. 8.

FIG. 9 illustrates a schematic cross-sectional front view of the solar hot water and distillation apparatus 2 shown in FIG. 8. The hot water tank 22 is enclosed by insulation 36.

An outlet pipe 42 is provided at the upper portion of the hot water tank 22 so that hot water in the upper portion of the hot water tank 22 can be discharged through this outlet pipe 42 and further through the opening 28 provided in the end of the outlet pipe 42. An inlet pipe 44 is connected to the lower portion of the hot water tank 22. Water can be filled into the hot water tank 22 through the inlet pipe 44 and the opening 26 in the inlet pipe 44.

Water from the hot water tank 22 may be filled into the evaporation tray 18 manually or by using a level sensor and a solenoid valve, which may be energised by a photovoltaic module (not shown) or by another electrical energy source.

A first and a second outlet pipe 62 extend from the bottom surface of the evaporation tray 18. A tapping valve 38 may be provided in the distal end of each of the outlet pipes 62.

The twenty vacuum tubes 8 are evenly distributed along a horizontal line through the evaporation tray 18. Each end of the hot water tank 22 is provided with attachment structures 112 configured to engage with corresponding protruding structures in order to fix the hot water tank 22. An overflow member 33 formed as a tube is arranged in the evaporation tray 18. An outlet 37 is provided in the end of the overflow member 33. An opening member 35 is provided in the bottom portion of the evaporation tray 18. It can be seen that the hot water tank 22, the evaporation tray 18 and the distillate tank 30 (distillate collection member) are provided in the same condensation and evaporation chamber 24.

FIG. 10A illustrates a schematic view of a hot water and distillation apparatus 2, wherein the hot water tank 22 is shaped as a coiled tube. A vapour tight casing 78 encases the coiled tube. An insulation structure 36 surrounds the vapour tight casing 78.

The hot water and distillation apparatus 2 comprises an evaporation tray 18 with water and a collection tray 84. An electric heater 96 is thermally connected to the bottom plate of the evaporation tray 18. Accordingly, activation of the electric heater 96 will heat the water in the electric heater 96. Eventually, the water in the evaporation tray 18 will evaporate and flow upwards through openings 80, 82 in the collection tray 84.

The collection tray 84 is formed as a plate-formed structure arranged in an inclined configuration. Accordingly, distillate drops 60 collected by the collection tray 84 will form distillate 114 that will flow into the distillate outlet 86, from where it can be collected e.g. in a distillate tank or in a bottle.

The hot water tank 22 shaped as a coiled tube comprises an inlet pipe 44 and an outlet pipe 42. A pipe connects the inlet pipe 44 and the evaporation tray 18. A valve 92 is arranged and configured to provide fluid communication between the inlet pipe 44 and the evaporation tray 18. A water level sensor 94 is arranged in the evaporation tray 18 in order to determine the water level of the evaporation tray 18.

The hot water and distillation apparatus 2 may comprise a control unit (not shown) configured to regulate the valve 92 on the basis of the water level detected by the water level sensor 94. Accordingly, water can automatically be filled into the evaporation tray 18 by opening the valve 92, when the water level sensor 94 detects a water level below a predefined level.

FIG. 10B illustrates a schematic view of another hot water and distillation apparatus 2 according to the invention. The hot water and distillation apparatus 2 comprises a hot water tank 22 encased in a vapour tight casing 78, wherein an insulation structure 36 surrounds the vapour tight casing 78.

A hot water outlet 88 extends through the bottom portion of the hot water tank 22 towards the top portion of the hot water tank 22. A hot water inlet 90 is inserted through the bottom portion of the hot water tank 22.

The hot water and distillation apparatus 2 is provided with a water filled evaporation tray 18 and a collection tray 84 like the one shown in FIG. 10 A. An electric heater 96 is provided below the evaporation tray 18 in order to provide a thermal connection to the bottom plate of the evaporation tray 18. Activation of the electric heater 96 will heat the water in the evaporation tray 18 so that the water will evaporate and flow upwards through openings 80, 82 in the collection tray 84.

The collection tray 84 is plate-formed and arranged in an inclined configuration so that distillate drops 60 collected by the collection tray 84 will form distillate 114 that will flow into the distillate outlet 86. The distillate 114 can be collected e.g. in a distillate tank or in a bottle from the distillate outlet 86.

A pipe connects the inlet pipe 90 and the evaporation tray 18. A valve 92 is provided to establish fluid communication between the inlet pipe 90 and the evaporation tray 18. A water level sensor 94 is arranged in the evaporation tray 18 in order to determine the water level of the evaporation tray 18.

Like explained with reference to FIG. 10A the hot water and distillation apparatus 2 may comprise a control unit configured to regulate the valve 92 on the basis of the water level detected by the water level sensor 94. In this manner water can automatically be filled into the evaporation tray 18 by opening the valve 92, when the water level sensor 94 detects a water level below a predefined level.

In FIG. 10A and FIG. 10B, the evaporated water (vapour) will travel anticlockwise around the hot water tank 22. Due to the temperature difference between the vapour and the hot water tank 22, the vapour will condense on the outside surface of the hot water tank 22. As indicated in FIG. 10A and FIG. 10B, distillate drops 60 will fall down onto the collection tray 84 at which the drops 60 will form distillate 114 that will flow into the distillate outlet 86. It can be seen that the hot water tank 22, the evaporation tray 18 and the collection tray 84 (distillate collection member) are provided in the condensation and evaporation chamber 24. A vacuum pump 116 is arranged in the evaporation and condensation chamber 24 in order to allow for evacuation of the evaporation and condensation chamber 24. It is possible to energise the vacuum pump 116 by a photo-voltaic solar collection (not shown).

Figures 11A, 11B:
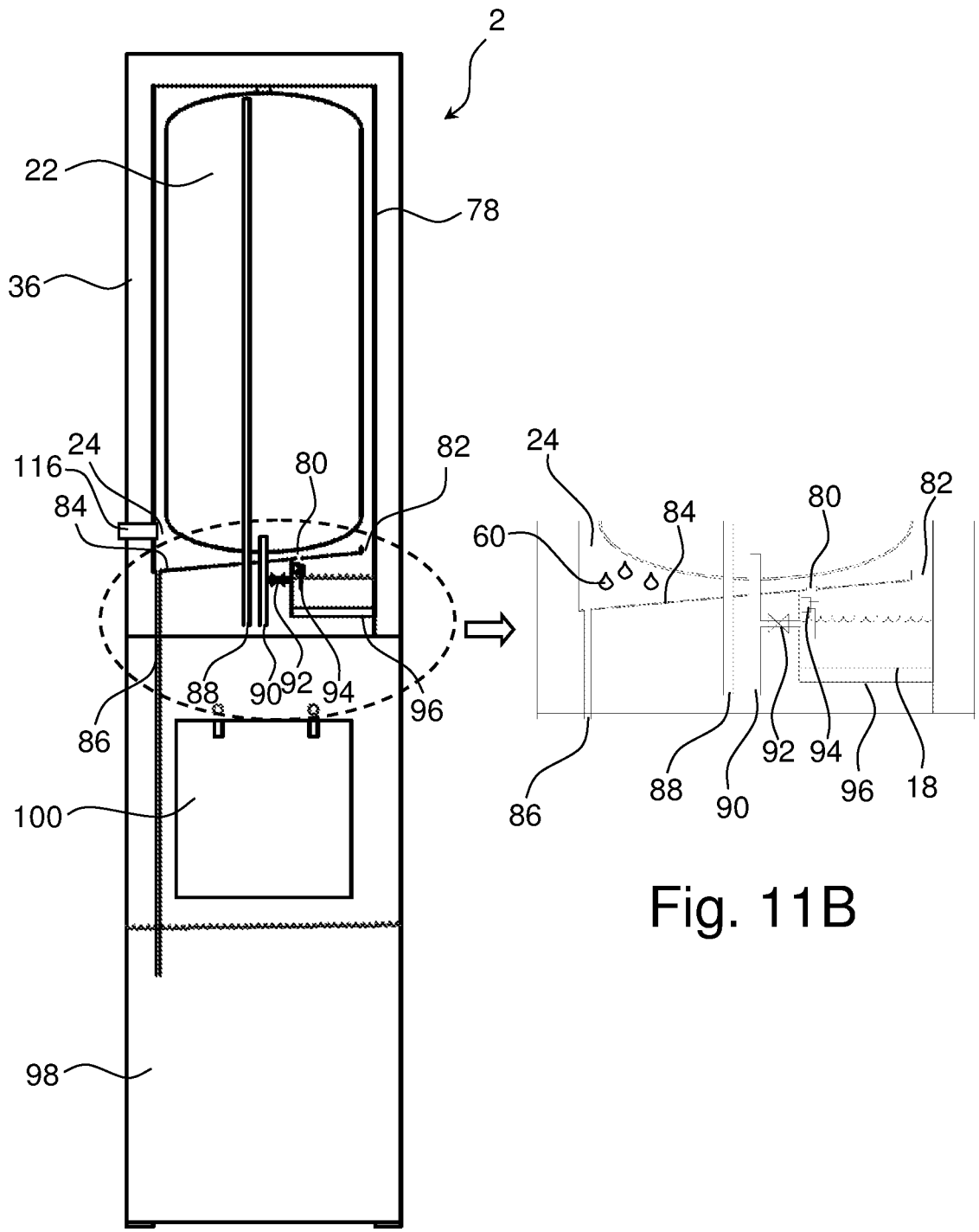
FIG. 11A shows a schematic view of a hot water and distillation apparatus according to the invention, wherein a water tank and water dispenser are integrated in the apparatus.
FIG. 11B shows a close-up view of the collection tray and the surrounding structures of the hot water and distillation apparatus shown in FIG. 11A.

FIG. 11A illustrates a schematic view of a hot water and distillation apparatus 2 according to the invention, wherein a water tank 22 and water dispenser 100 are integrated in the apparatus 2. FIG. 11B illustrates a close-up view of the collection tray 18 and the surrounding structures of the hot water and distillation apparatus 2 shown in FIG. 11A. The top portion of the hot water and distillation apparatus 2 corresponds to the construction shown in FIG. 10B.

The hot water and distillation apparatus 2 comprises a hot water tank 22 encased in a vapour tight casing 78, wherein an insulation structure 36 surrounds the vapour tight casing 78. A hot water outlet 88 extends through the bottom portion of the hot water tank 22 and extends towards the top portion of the hot water tank 22. A hot water inlet 90 extends through the bottom portion of the hot water tank 22.

The hot water and distillation apparatus 2 is provided with an evaporation tray 18 filled with water and an inclined plate-shaped collection tray 84. An electric heater 96 is arranged below the evaporation tray 18 for thermally connecting the bottom plate of the evaporation tray 18 and the electric heater 96. By activating the electric heater 96, the water in the evaporation tray 18 will evaporate and form vapour that will flow upwards through openings 80, 82 in the collection tray 84 and further around the water tank 22. Due to the temperature difference between the vapour and the hot water tank 22, the vapour will condense on the outside surface of the hot water tank 22. Accordingly, distillate drops 60 will fall down onto the collection tray 84 at which the drops 60 will form distillate 114 that will flow into the distillate outlet 86.

A pipe connects the inlet pipe 90 and the evaporation tray 18. A valve 92 is arranged to provide fluid communication between the inlet pipe 90 and the evaporation tray 18. A water level sensor 94 is provided in the evaporation tray 18 for determining the water level of the evaporation tray 18.

The hot water and distillation apparatus 2 may comprise a control unit adapted to regulate (turn on and turn off) the valve 92 on the basis of the water level detected by the water level sensor 94. In this manner, water can automatically be filled into the evaporation tray 18 by opening the valve 92, when the water level sensor 94 detects a water level below a predefined level. It can be seen that the hot water tank 22, the evaporation tray 18 and the collection tray 84 (distillate collection member) are provided in the condensation and evaporation chamber 24. An evacuation unit in the form of a vacuum pump 116 is provided in the evaporation and condensation chamber 24. The vacuum pump 116 is arranged and configured to allow for evacuation of the evaporation and condensation chamber 24. The vacuum pump 116 may be driven by a photo-voltaic solar collection (not shown).

Figures 12A, 12B:
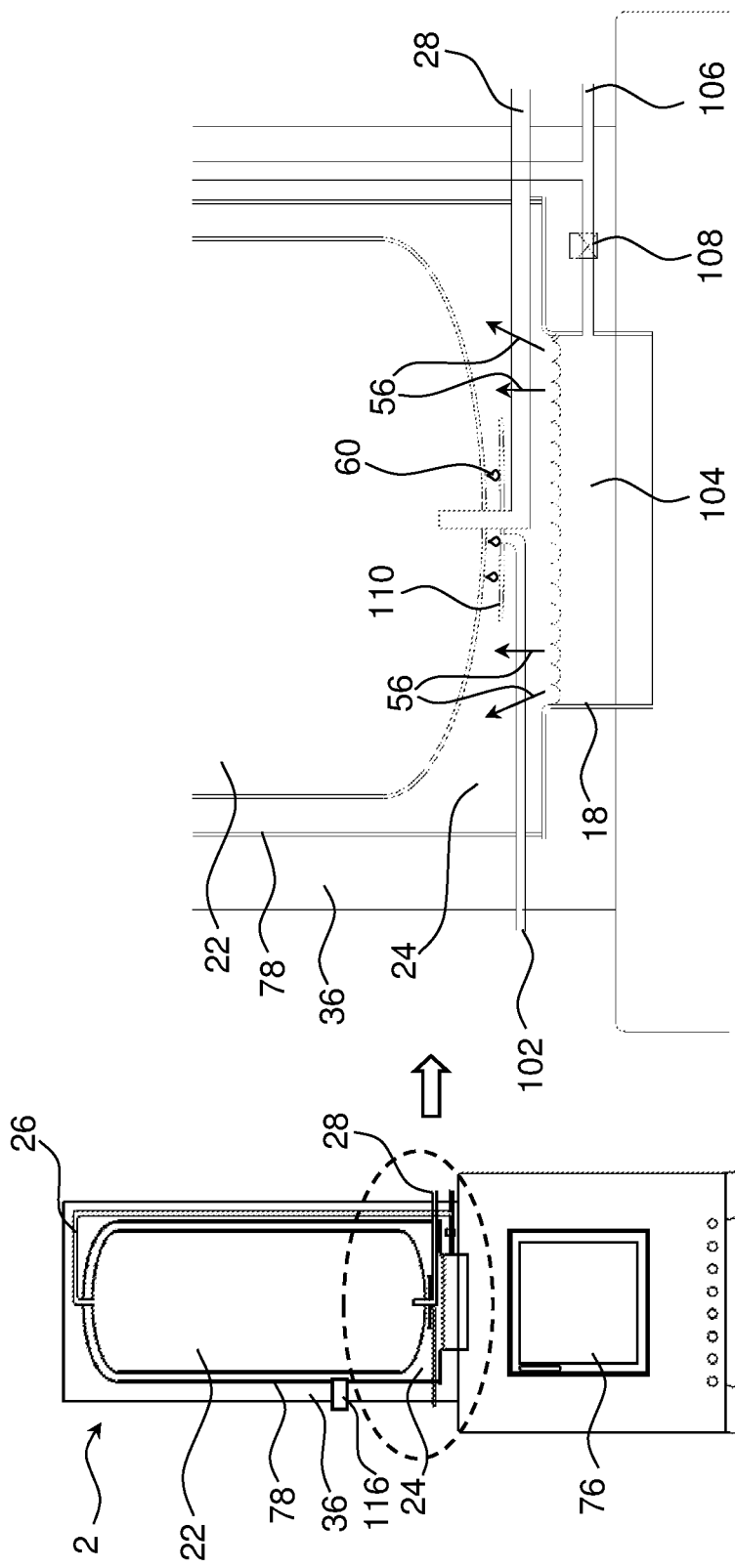
FIG. 12A shows a schematic view of a hot water and distillation apparatus according to the invention, wherein the heating source is a wood stove
FIG. 12B shows a close-up view of the distillate collection member and the surrounding structures of the hot water and distillation apparatus shown in FIG. 12A.

FIG. 12A illustrates a schematic view of a hot water and distillation apparatus 2 according to the invention, wherein the heating source is a wood stove 76. FIG. 12B illustrates a close-up view of the distillate collection member 110 and the surrounding structures of the hot water and distillation apparatus 2 shown in FIG. 12A.

The hot water and distillation apparatus 2 comprises a top portion having a hot water tank 22 encased in a vapour tight casing 78. An insulation structure 36 surrounds the vapour tight casing 78.

A wood stove 76 is provided below the top portion of the hot water and distillation apparatus 2.

The top portion of the hot water and distillation apparatus 2 comprises an evaporation tray 18 that is in thermal connection with the wood stove 76. Accordingly, the wood stove 76 cam heat the water 104 in the evaporation tray 18 and hereby produce vapour 56 that can condensate on the outer surface of the hot water tank 22 and form drops 60 of distillate. The drops 60 of distillate will be collected by the distillate collection member 110. The distillate collection member 110 is basically plate-shaped and is provided with an opening and a distillate pipe 102. The distillate pipe 102 is arranged and configured to conduct distillate to e.g. a distillate tank (not shown) or a collection bottle (not shown).

An inlet pipe 26 extends through the top portion of the hot water tank 22, and an outlet pipe 28 extends through the bottom portion of the hot water tank 22. The outlet pipe 28 extends through the vapour tight casing 78 and the insulation structure 36. Hereby, it is possible to draw off hot water from the hot water tank 22 via the outlet pipe 28.

The inlet pipe 26 is connected to an inlet pipe 106 protruding from the vapour tight casing 78 and the insulation structure 36 thus enabling an external water connection. The inlet pipe 26 is further connected to the evaporation tray 18 through a pipe, at which a valve member 108 is arranged. Accordingly, new water can be filled into the evaporation tray 18 through the inlet pipe 106. It can be seen that the hot water tank 22, the evaporation tray 18 and the distillate collection member 110 are provided in the condensation and evaporation chamber 24. An evacuation unit provided as a vacuum pump 116 is arranged in the evaporation and condensation chamber 24. The vacuum pump 116 is configured to allow for evacuation of the evaporation and condensation chamber 24. The vacuum pump 116 may be driven by a small photo-voltaic solar collection (not shown).

Alternative heating sources may be achieved. Such heating sources may include gas, oil, bioethanol or other suitable fuel.

By having a hot water and distillation apparatus 2 as described with reference to FIG. 12A and FIG. 12B, it is possible to produce drinking water, hot water for bathing and heat at the same time. In case that there is no access to drinking water and electricity, the invention provides a way to produce drinking water, hot water for bathing and heat at the same time.

LIST OF REFERENCE NUMERALS

2 Solar apparatus
4 Solar energy
6 Solar collector
8 Tube
10 Sun
12 Ground
14 Support
14', 14" Support member
16 Socket
18 Evaporation tray
20 Cleaning opening
22 Hot water tank
24 Evaporation and condensation chamber
26 Inlet port
28 Outlet port
29 Port
30 Distillate tank
32 Overflow tray
33 Overflow member
34 Opening
35 Opening member
36 Insulation
37 Outlet
38 Valve
40 Bottle
42 Outlet pipe
44 Inlet pipe
46 Valve
48 Tapping pipe
50 Outlet pipe
52 Valve
54 Connection pipe
56 Vapour
58 Front side
60 Drop (distillate)
62 Pipe
64 Upper portion
66 Lower portion
68 Connection
70 Support member
74 Condensation surface
76 Wood stove
78 Casing (vapour tight)
80 Opening
82 Opening
84 Collection tray 86 Distillate outlet
88 Hot water outlet
90 Cold water inlet
92 Valve
94 Water level sensor
96 Electrical heater
98 Water tank
100 Water dispenser
102 Distillate pipe
104 Water
106 Inlet pipe
108 Valve member
110 Distillate collection member
112 Attachment structure
114 Distillate
116 Evacuation unit (vacuum pump)
D Displacement
α Direction
I First half
II Second half
X Centre line
$Air_{cold}$ Cold and dry air
Y Longitudinal axis

The invention claimed is:

1. A hot water and distillation apparatus configured to simultaneously produce distilled water and hot water, wherein the hot water and distillation apparatus comprises:
a hot water tank;
a condensation and evaporation chamber;
an evaporation tray provided in the condensation and evaporation chamber;
a heat source thermally connected to the evaporation tray, wherein the hot water and distillation apparatus is configured to condense evaporated feed water from the evaporation tray by means of heat exchange between the hot water tank and a condensation surface, wherein the condensation surface is provided at the outside surface of the hot water tank, wherein the hot water and distillation apparatus comprises a distillate collection member configured to collect distillate, wherein the hot water tank, the evaporation tray and the distillate collection member are provided in the condensation and evaporation chamber and wherein the hot water tank is formed and positioned in the condensation and evaporation chamber having a first side of the outside surface of the hot water tank closer to a first adjacent wall of the condensation and evaporation chamber than a second opposite side of the outside surface of the hot water tank is to a second adjacent wall of the condensation and evaporation chamber, such that vapor from the evaporation tray is forced to flow one predefined way around the hot water tank as a result of the Venturi effect, wherein the vapor initially flows through a relatively wide passage between the second side of the outside surface of the hot water tank and the second adjacent wall of the condensation and evaporation chamber, followed by a gradually narrower passage between the first outside surface of the hot water tank and the first adjacent wall of the condensation and evaporation chamber while moving along the outside surface of the hot water tank.

2. The hot water and distillation apparatus of claim 1, further comprising means for dispensing water from the hot water tank into the evaporation tray.

3. The hot water and distillation apparatus of claim 1, the apparatus, further comprising an upper portion having a front side and an overflow member provided in the evaporation and condensation chamber, wherein the overflow member is displaced relative to the centre line of the hot water tank towards the front side of the upper portion.

4. The hot water and distillation apparatus of claim 3, wherein at least the central portion of the top portion of the evaporation and condensation chamber is cylindrical and wherein the hot water tank is cylindrical, wherein the hot water tank is arranged eccentrically relative to the evaporation and condensation chamber.

5. The hot water and distillation apparatus of claim 1 wherein the distillate collection member is a distillate tank, wherein the distillate tank is open and in fluid communication with the evaporation and condensation chamber and wherein the distillate tank is part of the condensation surface.

6. The hot water and distillation apparatus of claim 1 wherein the heat source is configured to be arranged inside a socket placed inside the evaporation tray and the socket is positioned in the upper half portion of the evaporation tray.

7. The hot water and distillation apparatus of claim 1 wherein the heat source is a solar collector.

8. The hot water and distillation apparatus of claim 1 wherein the evaporation and condensation chamber comprises an evacuation unit for evacuation of the evaporation and condensation chamber.

9. The hot water and distillation apparatus of claim 1 wherein the evaporation tray is detachably mounted in the evaporation and condensation chamber.

10. The hot water and distillation apparatus of claim 1 wherein the heat source is electrical.

11. The hot water and distillation apparatus of claim 1 wherein the distillate collection member is configured to collect distillate and comprises an inclined plate-shaped structure.

12. The hot water and distillation apparatus of claim 1 further comprising a level sensor arranged in the evaporation tray.

13. The hot water and distillation apparatus of claim 1 further comprising an inlet pipe arranged and configured to fill water into the hot water tank, wherein the hot water and distillation apparatus comprises a pipe extending between the inlet pipe and the evaporation tray, wherein a valve is arranged at the pipe extending between the inlet pipe and the evaporation tray.

14. The hot water and distillation apparatus of claim 3 wherein the overflow member is a pipe arranged in the evaporation tray.

15. The hot water and distillation apparatus of claim 1 wherein the evaporation tray is below the hot water tank and wherein a center of the evaporation is laterally displaced from a center of the hot water tank.

* * * * *